(12) United States Patent
Yi et al.

(10) Patent No.: US 11,701,870 B2
(45) Date of Patent: Jul. 18, 2023

(54) STRUCTURAL AND DECORATIVE COMPOSITE MATERIAL, PREPARATION METHOD THEREFOR, AND ARTICLE CONTAINING SAME

(71) Applicants: ACC (Beijing) Science and Technology Co., Ltd., Beijing (CN); Zhuzhou Lince Group Co., Ltd., Zhuzhou (CN)

(72) Inventors: Xiaosu Yi, Beijing (CN); Yan Tan, Zhuzhou (CN); Jianfeng Tong, Beijing (CN); Qinghua Liao, Zhuzhou (CN); Xu Chen, Beijing (CN); Feng Shi, Zhuzhou (CN); Hu Zhang, Beijing (CN); Le Luo, Zhuzhou (CN); Ziqing Liang, Beijing (CN); Nengwen Liu, Zhuzhou (CN); Lingsheng Zhong, Zhuzhou (CN)

(73) Assignees: ACC (Beijing) Science and Technology Co., Ltd.; Zhuzhou Lince Group Co., Ltd.

( * ) Notice: Subject to any disclaimer, the term of this patent is extended or adjusted under 35 U.S.C. 154(b) by 65 days.

(21) Appl. No.: 16/064,032

(22) PCT Filed: Dec. 21, 2015

(86) PCT No.: PCT/CN2015/098063
§ 371 (c)(1),
(2) Date: Jun. 20, 2018

(87) PCT Pub. No.: WO2017/107009
PCT Pub. Date: Jun. 29, 2017

(65) Prior Publication Data
US 2019/0001640 A1  Jan. 3, 2019

(51) Int. Cl.
*B32B 27/12* (2006.01)
*B32B 5/02* (2006.01)
(Continued)

(52) U.S. Cl.
CPC ................ *B32B 27/12* (2013.01); *B32B 3/12* (2013.01); *B32B 5/024* (2013.01); *B32B 5/245* (2013.01);
(Continued)

(58) Field of Classification Search
None
See application file for complete search history.

(56) References Cited

U.S. PATENT DOCUMENTS 2,400,379 A * 5/1946 Whitman ............... D03D 15/00
442/103
4,340,382 A * 7/1982 Morlino .............. D06M 13/165
510/506

(Continued)

FOREIGN PATENT DOCUMENTS

CN         1924210    *  3/2007
CN     101314649 A      12/2008
(Continued)

OTHER PUBLICATIONS

Machine translation of CN102785443 Daoping et al. (Year: 2012).*
(Continued)

*Primary Examiner* — Shawn McKinnon
(74) *Attorney, Agent, or Firm* — McAndrews, Held & Malloy, Ltd.

(57) ABSTRACT

Provided are a composite material and a preparation method therefor. The composite material comprises: a base layer; a first plant fibre fabric located on the upper surface of the base layer; optionally, a second plant fibre fabric located on the lower surface of the base layer; and resins present in each (Continued)

layer. The composite material has a decorative performance and an improved mechanical performance.

16 Claims, 3 Drawing Sheets

(51) Int. Cl.
*D06M 11/74* (2006.01)
*D06M 17/00* (2006.01)
*B32B 27/38* (2006.01)
*B32B 5/26* (2006.01)
*B32B 9/02* (2006.01)
*B32B 9/04* (2006.01)
*B32B 5/24* (2006.01)
*D06M 13/513* (2006.01)
*B32B 3/12* (2006.01)
*C08J 5/24* (2006.01)
*D01C 1/02* (2006.01)
*D01C 1/04* (2006.01)
*D06M 101/06* (2006.01)

(52) U.S. Cl.
CPC .................. *B32B 5/26* (2013.01); *B32B 9/02* (2013.01); *B32B 9/047* (2013.01); *B32B 27/38* (2013.01); *C08J 5/245* (2021.05); *D06M 11/74* (2013.01); *D06M 13/513* (2013.01); *D06M 17/00* (2013.01); *B32B 2250/03* (2013.01); *B32B 2250/20* (2013.01); *B32B 2255/02* (2013.01); *B32B 2255/24* (2013.01); *B32B 2260/021* (2013.01); *B32B 2260/023* (2013.01); *B32B 2260/046* (2013.01); *B32B 2262/0253* (2013.01); *B32B 2262/06* (2013.01); *B32B 2262/065* (2013.01); *B32B 2262/101* (2013.01); *B32B 2262/106* (2013.01); *B32B 2266/0235* (2013.01); *B32B 2305/022* (2013.01); *B32B 2305/024* (2013.01); *B32B 2305/076* (2013.01); *B32B 2307/3065* (2013.01); *B32B 2307/50* (2013.01); *B32B 2307/54* (2013.01); *B32B 2307/546* (2013.01); *B32B 2419/00* (2013.01); *B32B 2553/00* (2013.01); *B32B 2605/00* (2013.01); *B32B 2605/003* (2013.01); *B32B 2605/08* (2013.01); *B32B 2605/18* (2013.01); *D01C 1/02* (2013.01); *D01C 1/04* (2013.01); *D06M 2101/06* (2013.01)

(56) References Cited

U.S. PATENT DOCUMENTS

| | | | | |
|---|---|---|---|---|
| 4,617,383 A | * | 10/1986 | Jaskowski | C08B 37/0045 435/275 |
| 8,980,395 B2 | | 3/2015 | Ash et al. | |
| 2012/0298319 A1 | * | 11/2012 | Fujiwara | B01D 67/0004 162/100 |
| 2013/0149512 A1 | * | 6/2013 | Hijosa | D04H 1/4266 156/60 |
| 2013/0216756 A1 | | 8/2013 | Ash et al. | |
| 2014/0329429 A1 | * | 11/2014 | Eleazer | B32B 27/12 442/243 |

FOREIGN PATENT DOCUMENTS

| | | | |
|---|---|---|---|
| CN | 101407960 | * | 4/2009 |
| CN | 101491947 A | | 7/2009 |
| CN | 102321977 A | | 1/2012 |
| CN | 102649334 | * | 8/2012 |
| CN | 102785438 A | | 11/2012 |
| CN | 102785443 A | | 11/2012 |
| CN | 102785627 A | | 11/2012 |
| CN | 103538262 A | | 1/2014 |
| CN | 104513404 A | | 4/2015 |
| CN | 105155252 A | | 12/2015 |
| EP | 1075934 A2 | | 2/2001 |
| EP | 2801477 | | 11/2014 |
| WO | 02096716 A1 | | 12/2002 |
| WO | WO2010136720 | * | 12/2010 |

OTHER PUBLICATIONS

Machine translation of CN102321977 Xiaosu et al. (Year: 2012).*
Machine translation of CN101407960 (Year: 2009).*
Machine translation of CN1924210, Yu (Year: 2007).*
Machine translation of CN102649334 (Year: 2012).*
PCT International Search Report dated Jul. 28, 2016 for PCT Patent Application No. PCT/CN2015/098063 filed Dec. 21, 2015. (pp. 6).
PCT International Preliminary Report on Patentability, PCT/CN2015/098063, dated Jun. 26, 2018, 7 pages.
EPO Search Report, PCT/CN2015/098063, dated Oct. 7, 2019, 9 pages.

* cited by examiner

STRUCTURAL AND DECORATIVE COMPOSITE MATERIAL, PREPARATION METHOD THEREFOR, AND ARTICLE CONTAINING SAME

CROSS REFERENCE TO RELATED APPLICATIONS

This application is a national phase entry under 35 USC 371 of International Patent Application No. PCT/CN2015/098063 filed on Dec. 21, 2015, entitled "STRUCTURAL AND DECORATIVE COMPOSITE MATERIAL, PREPARATION METHOD THEREFOR AND ARTICLE CONTAINING SAME ", which is incorporated herein by reference in its entirety.

TECHNICAL FIELD

Embodiments of the present disclosure relate to a composite material comprising a plant fiber fabric, a preparation method therefor, and articles containing the same.

BACKGROUND

Plant fiber is a new kind of reinforcing fiber with extensive renewable resources, low cost, and easy to be recycled. Plant fiber is a kind of typical green raw material for manufacturing a composite material, and it is also a typical case that an agricultural product is used in material industry. The plant fiber meets the demand of the development of green manufacturing in China, and the plant fiber also conforms to a major trend for the sustainable development of the international community.

As can be seen from the Chinese patent application 200610150159.7 "Plant fiber composite fiberglass material and technique of preparing the same", the Chinese patent application 200810064906.4 "Heat pressing production method of polyethylene fiber-plant fiber compound material", and the Chinese patent application 200610062751.1 "Plant fiber composite artificial plate and its production process", plant fiber is mainly used as powder or staple fiber to fill or reinforce a composite material, but the mechanical property of the product made by the composite material is low. The Chinese patent application 201110181785.3 "Method for processing interfacially-compatibilized and flame-resistant plant fiber reinforced textile" has proposed a processing method of interfacial compatibilization and flame-retarding to improve the mechanical properties of a plant fiber reinforcing composite material. However, the plant fiber fabric used for manufacturing a composite material is usually produced by methods with a great damage to the fiber and a loss in the strength of the plant fiber fabric. In addition, all of these composite material products have no decorative function, and need to be coated or affixed after being formed, which makes the technical process long and the manufacturing cost high.

SUMMARY

The present disclosure provides a composite material, which comprises a base layer; a first plant fiber fabric on an upper surface of the base layer; optionally, a second plant fiber fabric on a lower surface of the base layer, and a resin present in each layer (i.e., the base layer, the first plant fiber fabric, and the second plant fiber fabric).

In some embodiments, the first plant fiber fabric has at least one of the following characteristics: having a printed or dyed pattern, having a natural color or a printed or dyed color, or having a white color. The surface component of the composite material can have a desired pattern or color, and the obtained composite material can have a decorative function, which allows the first plant fiber fabric to afford both the decorative function and mechanical properties. Therefore, the process of manufacturing the composite material can omit the decorative operations such as surface affixing to simplify the procedure and save the manufacturing cost.

In some embodiments, the first plant fiber fabric and the second plant fiber fabric are formed independently by a method of manufacturing a plant fiber fabric, and the method comprises biological or chemical degumming of raw fibers. By replacing the operations of "acid leaching, alkali boiling, stamping, acid washing and fiber refining" in other methods for manufacturing a fiber fabric with biological or chemical degumming, the preparation method has little damage to the fiber and an increased strength of the obtained plant fiber fabric, thereby improving the mechanical property of the composite material manufactured from the obtained plant fiber fabric.

In some embodiments, the first plant fiber fabric and the second plant fiber fabric are formed independently by a method of manufacturing a plant fiber fabric, and the method comprises: biological or chemical degumming of raw fibers, and drying to obtain a degummed fiber; pre-drawing, combing and gilling of the degummed fiber, and performing a roving process and a spinning process to obtain yarns; weaving the yarns into a gray fabric, rinsing the gray fabric with hot water and drying the gray fabric, and finally obtaining a half-bleached fabric, that is, the plant fiber fabric. In addition to biological or chemical degumming, the embodiments further replace operations of "singeing, desizing, and bleaching" used in other methods of manufacturing a plant fiber fabric with hot water rinsing, thereby further improving the mechanical property of the composite material obtained.

In some embodiments, the first plant fiber fabric and the second plant fiber fabric each independently have a fiber yarn twist of 0 tpm (twist per meter) to about 90 tpm, for example, from 0 tpm to about 60 tpm, or from about 20 tpm to about 60 tpm. Reducing the twist of the fibers results in an improvement in mechanical property of the fibers and thus the mechanical property of the manufactured composite material.

In some embodiments, the first plant fiber fabric and the second plant fiber fabric are a plant fiber fabric modified by carbon nanotube coating. The modification amount of carbon nanotubes is from 0.2 wt % to 5 wt % (or from 0.5 wt % to 2 wt %) based on the plant fiber fabric. Modification of the plant fiber fabric by carbon nanotubes improves the interlayer performance of the composite material, such as mode I interlaminar fracture toughness (GO and single fiber pull-out interfacial shear strength (IFSS).

In some embodiments, a laminated plate of the composite material has a tensile strength of greater than or equal to about 105 MPa, and a flexural strength of greater than or equal to about 178 MPa. In some embodiments, a laminated plate of the composite material has a tensile strength of greater than or equal to about 123 MPa, and a flexural strength of greater than or equal to about 186 MPa.

At least one embodiment of the present disclosure further provides a product containing the above mentioned composite material, such as an interior panel of a vehicle (especially an aircraft), a building material, an indoor panel, a structural packaging material and a sporting goods.

At least one embodiment of the present disclosure further provides a method for manufacturing a composite material, which comprises: producing a plant fiber fabric from a plant raw material, and forming a composite material by the plant fiber fabric, wherein the plant fiber fabric is the outermost layer of the composite material.

In some embodiments, the step of producing a plant fiber fabric from a plant raw material may comprise producing a plant fiber yarn from the plant raw material, and weaving the plant fiber yarn to obtain the plant fiber fabric. The weaving the plant fiber yarn to obtain the plant fiber fabric may comprise weaving the plant fiber yarn into a gray fabric, and processing the gray fabric to obtain a half-bleached fabric, that is, the plant fiber fabric.

At least one embodiment of the present disclosure further provides a method for manufacturing a composite material, which comprises: producing a plant fiber yarn from a plant raw material; weaving the plant fiber yarn into a plant fiber fabric; and using the plant fiber fabric to form a composite material whose outermost layer is the plant fiber fabric.

In some embodiments, producing the plant fiber yarn from the plant raw material comprises biological degumming or chemical degumming of raw fibers.

In some embodiments, the method for manufacturing the composite material may further comprise rinsing the plant fiber fabric with hot water of about 80° C. to 130° C. (or of about 90° C. to 120° C., or of about 100° C. to 115° C.) for about 1 minute to 1 hour, or for about 5 minutes to 30 minutes, or for about 8 minutes to 15 minutes. Hot water rinsing is used instead of singeing of the plant fiber fabric. In some embodiments, operations of "singeing, desizing, and bleaching" of the plant fiber fabric in other preparation methods are replaced with hot water rinsing. The low damage preparation method enables the fiber to retain its original mechanical property as much as possible, and improves the mechanical property of the composite material manufactured.

In some embodiments, the method further comprises: printing and dyeing the plant fiber fabric with a color or a pattern.

In some embodiments, the method further comprises: modifying the plant fiber fabric by carbon nanotube coating.

BRIEF DESCRIPTION OF THE DRAWINGS

In order to clearly illustrate the technical solution of the embodiments of the disclosure, the drawings of the embodiments will be briefly described. It is apparent that the described drawings are only related to some embodiments of the disclosure and thus are not limitative of the disclosure.

DETAILED DESCRIPTION

Figure 1:
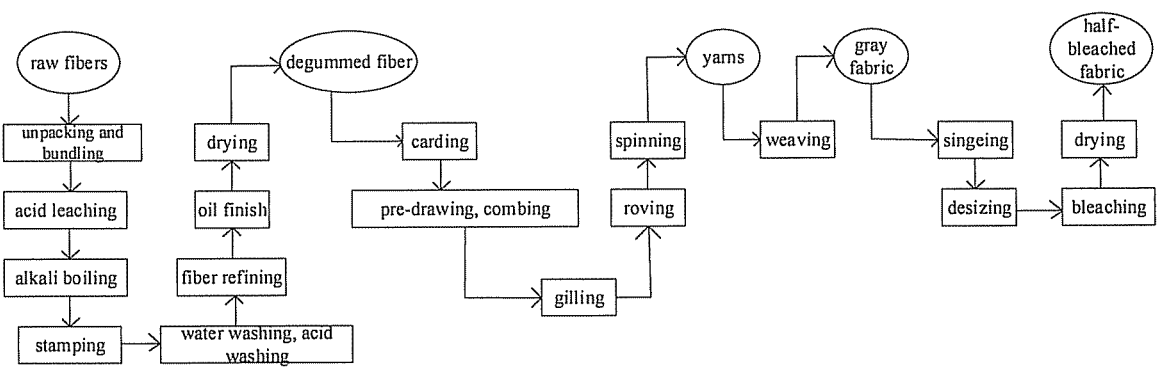
FIG. 1 shows a process for manufacturing a plant fiber fabric.

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

One aspect of the present disclosure relates to a composite material, which comprises: a base layer; a first plant fiber fabric on an upper surface of the base layer; optionally, a second plant fiber fabric on a lower surface of the base layer, and a resin present in each layer. In the present disclosure, the upper surface and the lower surface are relative concepts and do not represent a spatial height relationship. For example, the base layer has two surfaces, one of which is called as the upper surface, and the other is called as the lower surface. In the present disclosure, a resin present in each layer means that the resin exists in the base layer, the first plant fiber fabric and the optional second plant fiber fabric and the resin combines the above components of the composite material to afford a high mechanical property.

In the present disclosure, there is no limitation on the types of the first plant fiber fabric and the second plant fiber fabric, which may be any known plant fiber fabrics in the existing technologies as long as the performance of the manufactured composite material satisfies the application requirements. In some embodiments of the present disclosure, the first plant fiber fabric and the second plant fiber fabric are each independently fabrics made of the following materials: ramie, flax, jute, china-hemp (hemp), kenaf or sisal.

In some embodiments of the present disclosure, the first plant fiber fabric has at least one of the following characteristics: having a printed or dyed pattern, having a natural color or a printed or dyed color, or having a white color. The component of the surface of the composite material (i.e., the first plant fiber fabric) can have a desired pattern or color, and the obtained composite material can have a decorative function, which allows the first plant fiber fabric to afford both the decorative function and mechanical properties. Therefore, the process of manufacturing the composite material can omit the decorative operations such as surface affixing to simplify the working procedure and save the manufacturing cost.

In some embodiments of the present disclosure, the first plant fiber fabric and/or the second plant fiber fabric are treated by at least one of the following processes: a interfacial compatibilization treatment by using a coupling agent, a interfacial compatibilization treatment by using an aqueous solution of potassium permanganate, and a surface flame-retarding treatment by using a flame retardant. The mechanical property of the composite material can be improved by the interfacial compatibilization treatment of the first plant fiber fabric and/or the second plant fiber fabric. The flame retardant performance of the composite material can be improved by the surface flame-retarding treatment. The combination of these treatments can allow the composite material to have a good mechanical property and a flame retardant performance for meeting the requirements of different applications. For example, in a case that the composite material is used as an interior panel of a vehicle (especially an aircraft such as an airplane), it needs to meet the requirements of the vehicle on its mechanical property and flame retardant performance.

In the present disclosure, there is no special limitation on the resin as long as the composite material manufactured by the resin meets the performance requirements of the applications. In some embodiments, the resin is selected from a group consisting of: light-colored to colorless transparent thermoplastic resins and light-colored to colorless transparent thermosetting resins. The light-colored or colorless transparent resin material can retain the pattern and color of the plant fiber fabric on the surface as much as possible. In the present disclosure, for the "light-colored", as long as the color of the resin does not significantly influence the pattern and color of the first plant fiber fabric on the surface of the composite material by visual inspection. In the present disclosure, "colorless and transparent" means that: by visual inspection, the pattern and color of the first plant fiber fabric are completely retained on the formed composite material without color traces left by the resin at all. In some embodiments, the resin is selected from phenolic resin, epoxy resin or unsaturated polyester.

In the present disclosure, there is no limitation on the base layer as long as the composite material manufactured by the base layer meets the performance requirements of the applications. In some embodiments, the base layer is selected from the following materials: carbon fiber, glass fiber, aramid fiber, ultra-high molecular weight polyethylene fiber, basalt fiber fabric, plant fiber fabric, structural foam, and honeycomb core materials.

In some embodiments, the first plant fiber fabric and the second plant fiber fabric are each independently formed by a preparation method with little damage to fibers. In some embodiments, the first plant fiber fabric and the second plant fiber fabric are each independently formed by a method for manufacturing plant fiber fabrics, and the method comprises biological degumming of the raw fibers or chemical degumming of the raw fibers. The biological degumming/chemical degumming may be used instead of the steps of "acid leaching, alkali boiling, fiber stamping, acid washing, and fiber refining" in other methods for manufacturing fiber fabrics. In this way, the preparation method has little damage to fibers, and the strength of the obtained plant fiber fabric is increased, thereby improving the mechanical property of the composite material.

In some embodiments, the first plant fiber fabric and the second plant fiber fabric are each independently formed by a method for manufacturing plant fiber fabrics, and the method comprises treating plant fiber fabrics by hot water rinsing instead of the steps of "singeing, desizing, and bleaching". In the method for manufacturing plant fiber fabrics that comprises the steps of "singeing, desizing, and bleaching", the singeing step causes a great damage to fabric fibers, and thus the mechanical property of the obtained plant fiber fabrics is decreased. Therefore, hot water rinsing has little damage to the plant fibers, and the strength of the obtained fabric fiber fabric is well maintained, so that the mechanical property of the composite material obtained is improved.

In some embodiments, the first plant fiber fabric and the second plant fiber fabric are each independently formed by a method for manufacturing plant fiber fabrics, and the method comprises the following steps: biological or chemical degumming of the raw fibers, and drying to obtain a degummed fiber; pre-drawing, combing and gilling of the degummed fiber, and then performing a roving process and a spinning process to obtain yarns; weaving the yarns into a gray fabric; rinsing the gray fabric by hot water and drying the gray fabric, and finally obtaining a half-bleached fabric, that is, the plant fiber fabric. On the basis of using biological degumming/chemical degumming, the method of the embodiments further replaces the steps of "singeing, desizing, and bleaching" used in other methods for manufacturing plant fiber fabrics with hot water rinsing. In this way, these two steps with little damage to plant fibers are adopted, thereby maintaining the mechanical property of plant fibers in the best way and improving the mechanical property of the manufactured composite material.

In the present disclosure, there is no limitation on the twist of fiber yarns in the plant fiber fabrics as long as the property of the manufactured composite material meets the application requirements. However, low twist can improve the mechanical property of the manufactured composite material. In some embodiments, the twist of the first plant fiber fabric and the twist of the second plant fiber fabric each independently range from 0 tpm (twist per meter) to about 90 tpm, for example, from 0 tpm to about 60 tpm, from about 20 tpm to about 60 tpm, from about 10 tpm to about 30 tpm, from about 25 tpm to about 40 tpm, and from about 15 tpm to about 50 tpm. The tensile strength and tensile modulus of the composite material decrease with the increase of twist. Reducing the twist of the fibers results in an improvement in the mechanical property of the fibers and thus the mechanical property of the composite material manufactured. In addition, as the twist increases, the wettability of the resin to the fibers becomes poor and the porosity of the composite material increases. On the contrary, as the twist decreases, the wettability of the resin to the fibers increases and the porosity of the composite material decreases. Therefore, reducing the twist of plant fiber yarns not only decreases the damage to the microstructure of the plant fibers from twisting process, but also effectively improves the mechanical property of the plant fiber reinforced composite material because of the good fiber orientation angle and wettability in the low twist yarns.

The performance such as interlayer property of the composite material can further be improved by a low dimensional modification of the plant fiber. In some embodiments, both the first plant fiber fabric and the second plant fiber fabric are plant fiber fabrics modified by coating carbon nanotube. In some embodiments, the modification amount of carbon nanotubes is from about 0.2 wt % to about 5 wt % (or about 0.5 wt % to about 2 wt %), for example, from about 0.6 wt % to about 1.5 wt %, from about 0.8 wt % to about 1.2 wt % based on the weight of the plant fiber fabric. The modification of the plant fiber fabric by carbon nanotubes improves the interlayer performance of the composite material such as a mode I interlaminar fracture toughness (GO and a single fiber pull-out, interfacial shear strength (IFSS). In a case that the modification amount of carbon nanotubes is from about 0.8 wt % to about 1.2 wt %, an excellent modification performance is obtained.

In some embodiments, the first plant fiber fabric is a continuous fabric.

In some embodiments, at least one of the first plant fiber fabric and the second plant fiber fabric is a hollow structure or a porous structure. The hollow structure or the porous structure of the plant fiber fabric is naturally formed in the plant fiber, and the hollow structure or the porous structure affords the composite material the features of sound absorption, shock absorption, damping, impact resistance, noise reduction and so on.

In some embodiments, a composite material is provided, and the composite material comprises: a base prepreg layer; an upper prepreg layer containing the first plant fiber fabric and a first resin on the upper surface of the base prepreg layer; and optionally, a lower prepreg layer containing the second plant fiber fabric and a second resin on the lower surface of the base prepreg layer. In the embodiments, the first resin and the second resin are each independently selected from resins used in other embodiments. In some embodiments, the upper prepreg layer is a first plant fiber fabric impregnated with a first resin, or the upper prepreg layer is a laminate containing a first plant fiber fabric and a film of a first resin. In some embodiments, the lower prepreg layer is a second plant fiber fabric impregnated with a second resin, or the lower prepreg layer is a laminate containing a second plant fiber fabric and a film of a second resin.

In another aspect, some embodiments of the present disclosure provide a product which comprises any one of the above mentioned composite materials.

There is no limitation on the type of the product provided by the present disclosure. The product may especially be selected from some products that require both the structural performance and decorative performance, and may also be selected from some products that require the structural performance, flame-retarding performance and decorative performance. In some embodiments, the product is selected from an interior panel of a vehicle (such as an aircraft, an airplane cabin, a subway carriage, an automobile carriage, etc.), building materials, indoor panels, structural packaging materials, and sporting goods.

In another aspect, at least one embodiment of the present disclosure provides a method for manufacturing a composite material, and the method comprises:

producing a plant fiber yarn from a plant raw material;
weaving the plant fiber yarn to obtain a plant fiber fabric; and
using the plant fiber fabric to form the composite material whose outermost layer is the plant fiber fabric.

In the present disclosure, there is no limitation on the type of the plant material, as long as the manufactured composite material meets the application requirements. In some embodiments, the plant material is raw fiber.

In some embodiments, the raw fiber is selected from the group consisting of ramie, flax, jute, china-hemp (hemp), kenaf or sisal.

In some embodiments, the step of producing a plant fiber yarn from a plant raw material is carried out by a process with low damage to fiber yarns. In some embodiments, the step of producing a plant fiber yarn from a plant raw material comprises biological/chemical degumming of raw fibers.

In some embodiments, the method does not comprise acid leaching, alkali boiling, stamping, acid washing, and fiber refining of raw fibers. The operations of acid leaching, alkali boiling, stamping, acid washing, and fiber refining of raw fibers often cause great damage to raw fibers, which reduces the mechanical property of raw fibers. Therefore, in the process of producing plant fiber fabrics, these operations need to be avoided, and be replaced by biological degumming or chemical degumming.

In some embodiments, the method may further comprise the step of adjusting the twist of the plant fiber yarns as 0 tpm to about 90 tpm, 0 tpm to about 60 tpm, or about 20 tpm to about 60 tpm. The above mentioned lower twists can improve the mechanical property of the composite material. Therefore, in the present disclosure, the twist of the plant fiber yarns for manufacturing the plant fiber fabrics is as low as possible. There is no limitation on the method of adjusting the twist of the plant fiber yarns. For example, the untwist process may be carried out according to the National Standard of the People's Republic of China (GB 2543.2-89)—determination of twist in yarns, untwist-retwist method.

The performance (such as the interlayer performance) of the composite material can be further improved by a low dimensional modification of plant fibers. Therefore, in some embodiments, the method further comprises a low-dimensional modification of plant fibers. The low-dimensional modification may be carried out on the plant fiber fabric, and there is no limitation on the specific low-dimensional modification method. In some embodiments, the low-dimensional modification is carried out as follows: treating the plant fiber fabric with a mixture of carbon nanotubes (CNTs) and deionized water so that a carbon nanotube coating is formed on the plant fiber fabric. Therefore, in some embodiments, the low-dimensional modification is the carbon nanotubes modification.

In some embodiments, the carbon nanotubes modification is performed by using a mixture containing deionized water and carbon nanotubes with an amount of from about 0.2 wt % to about 5 wt % (or carbon nanotubes with an amount of from about 0.5 wt % to about 2 wt %), wherein the percentage is based on the total weight of the plant fiber fabric. In other words, the carbon nanotube coating formed on the plant fiber fabric is from about 0.2 wt % to about 5 wt % of the plant fiber fabric, for example, from about 0.5 wt % to 2 wt %, from about 0.6 wt % to about 1.5 wt %, and from about 0.8 wt % to about 1.2 wt % of the plant fiber fabric. In a case that the carbon nanotube coating is around 1 wt % of the plant fiber fabric (such as from about 0.8 wt % to about 1.2 wt %), the excellent single fiber pull-out interfacial shear strength (IFSS) and the excellent mode I interlaminar fracture toughness ($G_{1C}$) can be obtained.

In some embodiments, the method further comprises hot water rinsing of the plant fiber fabric. In the present disclosure, there is no limitation on the specific method of hot water rinsing. In some embodiments, the operation of hot water rinsing comprises rinsing the plant fiber fabric for about 1 minute to about 1 hour, or for about 5 minutes to about 30 minutes, or for about 8 minutes to about 15 minutes by hot water at a temperature of about 80° C. to about 130° C. (or about 90° C. to about 120° C., or about 100° C. to about 115° C.). Without hot water rinsing, the fibers are bonded together by a sizing agent, which makes the resin difficult to enter between the fibers and makes the performance of the composite material poor. After hot water rinsing, the fiber bundle becomes loose, and the distribution of pores between warp and weft yarns is more uniform to facilitate the impregnation of the resin, thereby improving the mechanical property of the composite material.

In some embodiments, the method excludes singeing of the plant fiber fabric. The singeing step would reduce the mechanical property of the plant fibers and thus the mechanical property of the composite material. Therefore, the preparation method without the singeing step reduces the damage to the plant fibers and improves the mechanical property of the plant fiber fabric, and thus the mechanical property of the composite material is improved.

In some embodiments, the method further comprises printing and dyeing the plant fiber fabric with a color or pattern. In a case that the plant fiber fabric is printed and dyed with a color or pattern, the color and pattern of the plant fiber fabric can be fully reflected by the appearance of the composite material. As such, the obtained composite material has the decorative function and there is no need for surface affixing treatment, so that the process is simplified and the manufacturing cost is reduced.

In some embodiments, using the plant fiber fabric to form the composite material comprises:

impregnating the plant fiber fabric with a resin to form a plant fiber fabric prepreg;

placing the plant fiber fabric prepreg on an upper surface of a base prepreg and optionally on a lower surface of the base prepreg to form a composite material precursor, and curing the composite material precursor to form the composite material.

In some embodiments, the curing is carried out under a pressure from about 0.1 MPa to about 5 MPa. For example, the curing pressure may be as follows: from about 0.2 MPa to about 4 MPa, from about 0.3 MPa to about 3 MPa, from about 0.5 MPa to about 2 MPa, or from about 0.8 MPa to about 1 MPa.

In some embodiments, the curing is carried out at a temperature from about 20° C. to about 100° C. The curing temperature is selected according to a first resin and optionally a second resin used in the composite material. The curing temperature may be as follows: from about 30° C. to about 90° C., from about 40° C. to about 80° C., from about 50° C. to about 70° C., or from about 55° C. to about 65° C.

In some embodiments, the curing is carried out for about 0.5 hours to about 1 week, for example, for about 1 hour to about 1 week. The curing time is selected according to the conditions such as the first resin and optionally the second resin used in the composite material and the selected curing pressure. The curing time may be as follows: from about 0.5 hours to about 1 week, from about 2 hours to about 2 days, from about 4 hours to about 1 day, or from about 8 hours to about 12 hours.

FIG. 1 shows a process for manufacturing a plant fiber fabric. The manufacturing process illustrated in FIG. 1 comprises the following operations: unpacking and bundling of raw fibers; acid leaching, alkali boiling, stamping, acid washing and fiber refining, and then oil finish, drying to obtain degummed fiber; carding, pre-drawing, combing, and gilling of the degummed fiber, and performing a roving process and a spinning process to obtain yarns; weaving the yarns into a gray fabric; singeing, desizing, bleaching and drying of the gray fabric, and finally getting a half-bleached fabric, that is, the plant fiber fabric. The preparation process illustrated in FIG. 1 is the preparation process of continuous plant fiber (yarn) for garment industry.

Figure 2:
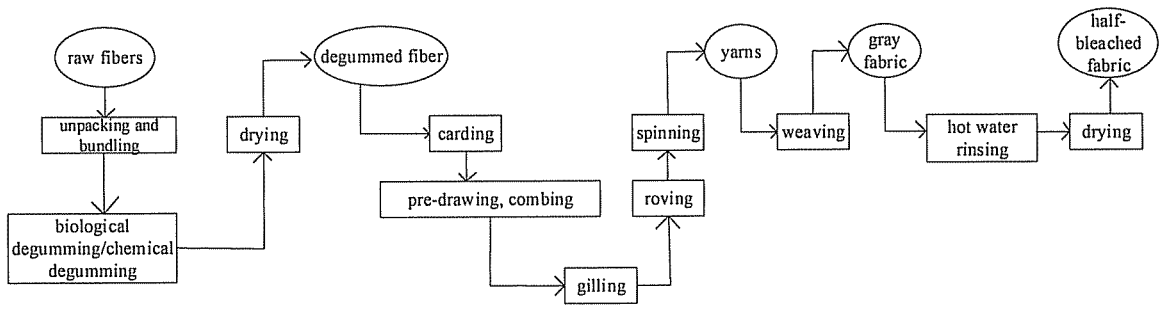
FIG. 2 shows another process for manufacturing a plant fiber fabric.

FIG. 2 shows another process for manufacturing a plant fiber fabric. The manufactured process illustrated in FIG. 2 comprises the following operations: biological degumming/chemical degumming of raw fibers; drying to obtain a degummed fiber; carding, pre-drawing, combing and gilling of the degummed fiber, and performing a roving process and a spinning process to obtain yarns; weaving the yarns into a gray fabric; rinsing the gray fabric with hot water and drying the gray fabric, and finally getting a half-bleached fabric, that is, the plant fiber fabric. The manufacturing process illustrated in FIG. 2 is a manufacturing process of industrial reinforced plant fibers (yarns). The difference between the preparation method shown in FIG. 2 and the preparation method shown in FIG. 1 is that the steps of "acid leaching, alkali boiling, stamping, acid washing and fiber refining" in FIG. 1 are replaced with one step of "biological degumming" or "chemical degumming" in FIG. 2, and the three steps of "singeing, desizing and "bleaching" in FIG. 1 are replaced with one step of "hot water rinsing" in FIG. 2. Compared with the manufacturing process in FIG. 1, the manufacturing process in FIG. 2 not only reduces the damage to plant fibers, but also simplifies the process and decreases the cost. There is no special limitation on the technologies of degumming and hot water rinsing in FIG. 2.

A Specific Method of Biological Degumming

In some embodiments of the present disclosure, the method for manufacturing the composite material comprises the step of biological degumming of raw fibers. The step of biological degumming is used instead of the steps of "acid leaching, alkali boiling, stamping, acid washing and fiber refining" in other methods.

The step of biological degumming comprises treating raw fibers with an aqueous solution of enzymes such as pectinase, xylanase, mannanase, hemicellulase, lipase or protease. In particular, the usage of pectinase and hemicellulase can remove most of the gum components on the surface of raw fibers, and the reaction condition is mild, which protects the original structure of the fiber and causes little damage to the fiber.

A specific method of chemical degumming.

In some embodiments of the present disclosure, the method for manufacturing the composite material comprises the step of chemical degumming of raw fibers. The step of chemical degumming is used instead of the steps of "acid leaching, alkali boiling, stamping, acid washing and fiber refining" in other methods.

Chemical degumming may comprise adding in the degumming process a new auxiliary such as sodium triphosphate ($Na_5P_3O_{10}$), a surfactant and a non-acid leaching preparation to replace two boilings after acid leaching with a one-pot cooking method of a non-acid leaching. That is, the steps of leaching by a non-acid leaching preparation, acid washing, water rinsing, and drying are employed. There is no special limitation on the surfactant herein, and the surfactant may be selected from sodium dodecylbenzene sulfonate, sodium polyacrylate, polyvinyl alcohol, alkyl polyoxyethylene ether, and sodium dibutyl naphthalene sulfonate. There is no limitation on the non-acid leaching preparation, which may be selected from an antifoaming agent, urea, and caustic soda.

A specific method of rinsing with hot water.

In some embodiments of the present disclosure, the method for manufacturing the composite material further comprises hot water rinsing of the plant fiber fabric. The hot water rinsing procedure is used instead of the steps of "singeing, desizing, and bleaching" in other methods.

The step of hot water rinsing comprises rinsing the plant fiber fabric for from about 1 minute to about 1 hour, or about 5 minutes to about 30 minutes, or about 8 minutes to about 15 minutes by using hot water at a temperature from about 80° C. to about 130° C. (or hot water at a temperature from about 90° C. to about 120° C., or hot water at a temperature from about 100° C. to about 115° C.).

The tensile strength, tensile modulus, flexural strength and flexural modulus of the composite material that is manufactured by the plant fiber fabric rinsed with hot water, are greatly improved mainly due to two reasons. The first reason is that the "singeing" step is omitted. Although the "singeing" step does not directly damage the mechanical property of the fibers, it damages the microstructure of the fiber surface. The method without the "singeing" step thus reduces the damage of the fiber surface microstructure, and the fiber surface microstructure affords a stronger interaction between the fiber and the resin matrix, so that the mechanical property of the composite material is improved at a certain degree. The second reason is that: without hot water rinsing, the fibers in the plant fiber fabric are bonded together by a sizing agent, which makes the resin difficult to enter between the fibers and makes the performance of the composite material poor. After hot water rinsing, the fiber bundle becomes loose, and the distribution of pores between warp and weft yarns is more uniform to facilitate the impregnation of the resin, thereby improving the mechanical property of the composite material.

In the following, the present disclosure is further explained by some examples.

EXAMPLES

The raw materials used in the examples are shown in the following table.

The following materials were used in the examples of the present disclosure, and other materials were conventional or were commercially available:

TABLE 1

Raw Materials and Sources

| Raw Materials | Sources | Note |
|---|---|---|
| Raw Ramie Fiber | Hunan Huasheng Dongting Ramie Co., Ltd. | Commercially Available |
| Coupling Agent KH570 | Beijing Huabozhan Scientific Instrument Co., Ltd. | Commercially Available |
| Silane Coupling Agent KH550 | Beijing Huabozhan Scientific Instrument Co., Ltd. | Commercially Available |
| Ethanol | Beijing Huabozhan Scientific Instrument Co., Ltd. | Commercially Available |
| GMA | Beijing Huabozhan Scientific Instrument Co., Ltd. | Commercially Available |
| HEMA | Beijing Huabozhan Scientific Instrument Co., Ltd. | Commercially Available |
| Flax Fabric | Xinshen Group Co., Ltd. | Commercially Available |
| Sisal Fiber | Guangxi Sisal Group Shanwei Sisal Products Co., Ltd. | Commercially Available |
| Glass Fiber | Beijing Glass Steel Institute Composite Material Co., Ltd. | Commercially Available |
| A commercial plain, twill or satin ramie fiber fabric having a natural color or a brilliant color or pattern by printing and dyeing | Jiangxi Enda Ramie Co., Ltd. | |
| Epoxy Resin E44 | Shanghai Kaiping Resin Co., Ltd. | Commercially Available |
| Dehydrated T31 Curing Agent | Shanghai Kaiping Resin Co., Ltd. | Commercially Available |
| Prepreg Preform of a Cheap Plant Fiber Fabric | Homemade, a typical cheap fabric is jute fabric | Manufactured from Jute Plants |
| PMI Honeycomb Sliced Preform | AVIC Composite Corporation Ltd. | Honeycomb Height 10 mm |
| Polyurethane Rigid Foam Slab Preform | Langfang Fuerda Chemical Building Materials Co., Ltd. | Commercially Available Honeycomb Height 10 mm |
| Commercial Liquid Flame Retardant | Changzhou Niulei Retardant Factory | Commercially Available |

In the examples, the experimental data were measured by the methods in the following table:

TABLE 2

Properties and Test Methods of the Composite Material

| | |
|---|---|
| Tensile Modulus | Measured by the GB/T 1447 standard |
| Flexural Strength | Measured by the GB/T 1449 standard |
| Flexural Modulus | Measured by the GB/T 1449 standard |
| Tensile Strength | Measured by the GB/T 1447 standard |
| Mode I Interlaminar Fracture Toughness ($G_{IC}$) | Measured by the ASTM D 5528 standard |
| Single Fiber Pull-out Interfacial Shear Strength | Measuring the single fiber tensile strength according to the ASTM D3379 standard, and calculating the interfacial shear strength according to the Kelly-Tyson formula. |
| Density (g/cm$^3$) | The density is measured by techniques known in the field. The density is obtained by measuring the mass and volume of the object and then calculation. |
| Specific Tensile Strength (MPa cm$^3$/g) | calculated by the ratio of the tensile strength to the density of the material |
| Specific Flexural Strength (MPa cm$^3$/g) | calculated by the ratio of the flexural strength to the density of the material |
| Specific Flexural Modulus (GPa cm$^3$/g) | calculated by the ratio of the flexural modulus to the density of the material |

Example 1 (Chemical Degumming and Biological Degumming)

The raw ramie fiber (purchased from Hunan Huasheng Dongting Ramie Co., Ltd.) was used to prepare the ramie fiber fabric according to the process in FIG. 1 except that the operations of "acid leaching, alkali boiling, stamping, acid washing and fiber refining" in FIG. 1 were replaced with "biological degumming" or "chemical degumming" in FIG. 2. Then the ramie fiber fabric prepared above was used as the outer fabrics (i.e., the first plant fiber fabric and the second plant fiber fabric), and the cheap plant fiber was used as the middle layer (namely the base layer, it specifically comprised a fabric made of jute fiber). Then the fiber fabric with a three-layer structure was infused with an unsaturated polyester (100 parts of unsaturated polyester-styrene and 3 to 4 parts of cyclohexanone peroxide), and then the composite materials was prepared by a conventional hot pressing molding (80° C./1 hour). The results of mechanical performance test were shown in table 3.

Table 3 compared the mechanical property of composite materials prepared by the biological/chemical degumming method with the results of the method shown in FIG. 1, in which a unit of twist is tpm (twist per meter).

TABLE 3

| | Unsaturated Polyester | Acid Leaching, alkali Boiling, Stamping, Acid Washing and Fiber Refining (FIG. 1) | Biological Degumming | Chemical Degumming |
|---|---|---|---|---|
| Fiber Volume Fraction % | — | 40.31 | 38.70 | 39.20 |
| Twist/tpm | 60 | 60 | 60 | 60 |
| Tensile strength/MPa | 38.41 | 80.71 | 104.20 | 105.15 |
| Tensile modulus/GPa | 7.54 | 13.352 | 14.886 | 15.582 |
| Flexural strength/MPa | 80.6 | 128.71 | 146.66 | 145.28 |
| Flexural modulus/GPa | 7.54 | 10.783 | 11.135 | 11.691 |

As can be seen from table 3, tensile strength, tensile modulus, flexural strength, and flexural modulus of the composite material containing the plant fiber fabric prepared by the "biological degumming" or "chemical degumming" method were significantly higher than those of the composite material containing the plant fiber fabric prepared by the method in FIG. 1.

It needs to be further explained that, the treatment of biological degumming has less impact on the environment, and results in better mechanical property of the fiber and the final composite material. Therefore, biological degumming is more preferable for preparing the composite material.

Example 2 (Rinsing with Hot Water)

The raw ramie fiber (purchased from Hunan Huasheng Dongting Ramie Co., Ltd.) was used to prepare the ramie fiber fabric according to the process in FIG. 1 except that the operations of "singeing, desizing, and bleaching" in FIG. 1 was replaced with "hot water rinsing" in FIG. 2. Then an unsaturated polyester composite material was prepared from the ramie fiber fabric, and the resin materials and molding method used were similar to those in Example 1. The results of mechanical performance test were shown in table 4.

Table 4 compared the mechanical property of the composite material prepared by hot water rinsing with the mechanical property of the composite material prepared by the method shown in FIG. 1.

TABLE 4

| | Unsaturated Polyester | Singeing, Desizing, and Bleaching (FIG. 1) | Hot Water Rinsing Process |
|---|---|---|---|
| Fiber Volume Fraction % | — | 40.31 | 40.48 |
| Resin Weight Content wt % | — | 59.80 | 59.51 |
| Twist/tpm | 60 | 60 | 60 |
| Tensile strength/MPa | 38.41 | 80.71 | 90.35 |
| Tensile modulus/GPa | 7.54 | 13.352 | 12.438 |
| Flexural strength/MPa | 80.6 | 128.71 | 149.80 |
| Flexural modulus/GPa | 7.54 | 10.783 | 12.162 |

As can be seen from the comparison in table 4, tensile strength, tensile modulus, flexural strength, and flexural modulus of the composite material prepared by hot water rinsing method were significantly higher than those of the composite material prepared by the traditional technology. This was mainly because the "singeing" process damaged the microstructure of the fiber surface although it did not directly damage the mechanical property of the fiber. The method without the "singeing" step in this example thus reduced the damage of the fiber surface microstructure, and the fiber surface microstructure afforded a stronger interaction between the fiber and the matrix, so that the mechanical property of the composite material was improved at a certain degree.

Example 3 (Hot Water Rinsing and Twist, Etc.)

The raw ramie fiber (purchased from Hunan Huasheng Dongting Ramie Co., Ltd.) was used to prepare the ramie fiber fabric according to the process in FIG. 1 except that one or more of operations "stamping" and "fabric refining" in preparing the degummed fiber from the raw fibers and operations "singeing", "desizing" and "bleaching" in preparing a half-bleached fabric from the gray fabric were omitted, and the twist of the fiber was optionally decreased. Then an unsaturated polyester composite material was prepared from the ramie fiber fabric, and the resin materials and molding method used were similar to those in Example 1. The results of mechanical performance test were shown in table 5.

Table 5 illustrated a comprehensive comparison of the mechanical property of the composite material prepared in example 3.

TABLE 5

| Process of Preparing Plant Fiber Fabric | Twist (tpm) | Tensile Strength (MPa) | Tensile Modulus (GPa) | Flexural Strength (MPa) | Flexural Modulus (GPa) |
|---|---|---|---|---|---|
| Process in FIG. 1 | 60 | 76.8 | 11.6 | 126.1 | 9.6 |
| "Stamping and Fabric Refining" were omitted | 60 | 80.7 | 13.4 | 128.7 | 10.8 |
| "Stamping, Fabric Refining and Singeing" were omitted | 60 | 90.4 | 12.4 | 149.8 | 12.2 |
| "Stamping, Fabric Refining and Singeing" were omitted; "Desizing and Bleaching" were replaced with hot water rinsing; the twist of the fiber was reduced 10% | 54 | 105.2 | 15.6 | 145.3 | 11.7 |
| "Acid Leaching, Alkali boiling, Stamping, Acid Washing and Fiber Refining" were replaced with biological degumming; "Singeing, Desizing and Bleaching" were replaced with hot water rinsing; the twist of fabric was reduced 10% | 54 | 112.62 | 15.375 | 155.33 | 12.008 |
| "Acid Leaching, Alkali boiling, Stamping, Acid Washing and Fiber Refining" were replaced with chemical degumming; "Singeing, Desizing and Bleaching" were replaced with hot water rinsing; the twist of fabric was reduced 10% | 54 | 113.66 | 16.140 | 157.81 | 12.086 |

As can be seen from table 5, the operations of "desizing" and "bleaching" were simplified by hot water rinsing, which can remove the sizing agent without damage to the fiber. The method not only improved the mechanical property of the ramie fiber, but also simplified the process and reduced the processing cost, thereby making the ramie products more cost-effective. It can also be seen from table 5 that reducing the twist of the fiber further improved the mechanical property of the composite material.

Example 4 (Coupling Agent Treatment and Hot Water Rinsing)

The raw ramie fiber (purchased from Hunan Huasheng Dongting Ramie Co., Ltd.) was used to prepare the ramie fiber fabric according to the process in FIG. 1 except that operations "singeing", "desizing" and "bleaching" were replaced with "treatment with the coupling agent solution in ethanol at different pH" and/or "hot water rinsing (110° C./10 min)". Then an unsaturated polyester composite material was prepared from the ramie fiber fabric, and the resin materials and molding method used were similar to those in Example 1. The results of mechanical performance test were shown in table 6.

Table 6 showed the influence of coupling agent treatment and hot water rinsing treatment on mechanical property of the plant fiber composite material (the fiber volume fraction of all composite materials was about 40%)

As can be seen from table 6, after the ramie fiber fabric being soaked in the coupling agent and being rinsed with hot water (110° C./10 min), the tensile strength of the composite material prepared was increased by about 40%. It was also found that all the selected coupling agent treatment methods had positive influence on the tensile property and flexural property of the ramie fiber composite material.

In addition, the surface of the ramie fiber fabric was observed by SEM after hot water rinsing (110° C./10 min). As can be seen from SEM, the fibers were bonded together by a sizing agent without hot water rinsing, which made the resin difficult to enter between the fibers and made the performance of the composite material poor. The fiber bundle became loose after hot water rinsing, and the distribution of pores between warp and weft yarns was more uniform to facilitate the impregnation of the resin, thereby improving the mechanical property of the composite material.

Example 5 (Low Dimensional Nanometer Modification)

Flax fabric (purchased from Xinshen Group Co., LTD.) was used. Carbon nanotubes (CNTs) were mixed with deionized water by microfluidization with 10 dispersion cycles and a pressure of 25000 Psi. Then CNTs were sprayed onto the flax fabric, and the ionized water was removed by drying to obtain the CNTs treated flax fabric. Afterwards, the

TABLE 6

| Treatment Conditions | Tensile Strength/MPa | Tensile Modulus/GPa | Flexural Strength/MPa | Flexural Modulus/GPa |
|---|---|---|---|---|
| No Coupling Treatment | 83.5 | 13.9 | 121.2 | 10.3 |
| Coupling agent KH570, neutral, 2% ethanol solution, air drying | 95.5 | 12.4 | 111.5 | 8.9 |
| KH570, pH = 4, 2% ethanol solution, air drying | 90.3 | 16.4 | 111.1 | 9.3 |
| KH570, neutral, 2% ethanol solution, hot water rinsing 110° C./10 min | 118.4 | 15.7 | 122.6 | 10.4 |
| KH570, neutral, 2% ethanol solution, hot water rinsing 110° C./10 min | 115.1 | 14.9 | 120.7 | 8.9 |
| GMA, neutral, 2% ethanol solution, hot water rinsing 110° C./10 min | 112.1 | 14.7 | 95.1 | 8.5 |
| HEMA, neutral, 2% ethanol solution, hot water rinsing 110° C./10 min | 81.9 | 10.6 | 77.0 | 6.6 | reinforced composite material of the carbon nanotubes modified flax fiber was prepared by a vacuum perfusion process.

By comparing the effect of the flax fiber modified by CNTs coating on the interlaminar fracture toughness of the reinforced composite material, it was found that compared with the composite material of an untreated flax fiber (CNTs=0%), the mode I interlaminar fracture toughness of the plant fiber composite material ($G_{1C}$ obtained by 1.0% CNTs treatment was increased by 31%. Single fiber pull-out test found that the single fiber pull-out interfacial shear strength (IFSS) of the flax without nanometer modification (CNTs=0%) was 43.7 MPa, IFSS with 0.5% CNTs content was 51.6 MPa, IFSS with 1% CNTs content was 55.0 MPa, and IFSS with 2% CNTs content was 53.3 MPa. As can be seen from the above, 1% CNTs content resulted in the largest IFSS, which indicated that the modification of CNTs coating had a certain improvement effect on the interlayer performance of the flax fiber composite material. The specific results were shown in the following table.

TABLE 7

Composite Materials Containing the Flax Fabric Modified by CNTs

| | Mode I Interlaminar Fracture Toughness ($G_{1C}$) | Single Fiber Pull-out Interfacial Shear Strength (IFSS) |
|---|---|---|
| CNTs = 0% | 1.35 kJ/m$^2$ | 43.7 MPa |
| 0.5% CNTs | 1.52 kJ/m$^2$ | 51.6 MPa |
| 1.0% CNTs | 1.78 kJ/m$^2$ | 55.0 MPa |
| 2.0% CNTs | 1.60 kJ/m$^2$ | 53.3 MPa |

Example 6 (Twist)

Unsaturated polyester composite materials were prepared from commercial sisal fibers, and the resin materials and the molding methods were similar to example 1. Then the mechanical property was tested to investigate the effect of the fiber twist on the mechanical property of the composite materials. The results showed that the tensile strength and the tensile modulus of the composite material were decreased with the increase of twist (table 8). In the present example, the untwist process was carried out according to the National Standard of the People's Republic of China (GB 2543.2-89, previously GB 2543-81)—determination of twist in yarns, untwist-retwist method. This was because an angle between the fiber and the loading direction increased with an increase in the twist and the loading efficiency of the fiber was reduced. In addition, as the twist increased, the wettability of the resin to the fibers became poor and the porosity of the composite material increased. Therefore, reducing the twist of the plant fiber yarn can decrease the damage to the microstructure of the plant fiber in the twisting process. At the same time, a good fiber orientation angle and a good wetting performance of the low-twist yarn can improve the mechanical property of the plant fiber reinforced composite material.

TABLE 8

Effect of sisal yarns with different twists on the mechanical property of the composite materials

| Twist of Sisal Fiber (tpm) | Tensile Strength (MPa) | Tensile Modulus (GPa) | Porosity of Composite Material (%) |
|---|---|---|---|
| 0 (Without Twisting) | 212.20 | 24.32 | 0.52 |
| 20 | 158.33 | 24.06 | 1.33 |
| 60 | 125.26 | 22.02 | 1.57 |
| 90 | 96.37 | 18.28 | 1.87 |
| 150 | 59.78 | 9.85 | 3.21 |

As can be seen from the above data, proper untwisting or detwisting of plant fibers can make the performance potential of the plant fibers work and improve the resin impregnation.

The results of experiments on sisal fibers and glass fibers without fiber buckling and twisting were shown in table 9. The results in table 9 showed that the specific strength and specific modulus of the plant fiber reinforced composite material were close to those of the glass fiber reinforced composite material without fiber buckling and twisting.

TABLE 9 compared mechanical properties of a unidirectional untwisted and unbuckled sisal composite material and those of a unidirectional glass fiber

| Composite Material | Density (g/cm$^3$) | Specific Tensile Strength (MPa cm$^3$/g) | Specific Tensile Modulus (GPa cm$^3$/g) | Specific Flexural Strength (MPa cm$^3$/g) | Specific Flexural Modulus (GPa cm$^3$/g) |
|---|---|---|---|---|---|
| Unidirectional Sisal | 1.20 | 140.1 | 19.8 | 231.7 | 19.3 |
| Unidirectional Glass Fiber | 1.98 | 226.4 | 21.2 | 138.4 | 15.1 |

Example 7 (Example with Natural Color or a Printing and Dyeing Pattern)

Figure 3:
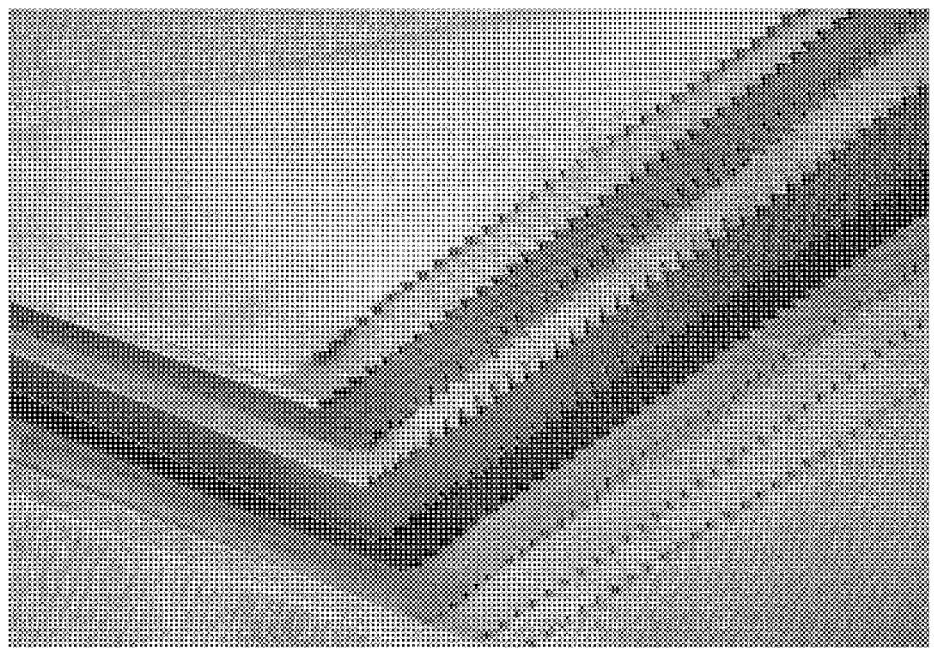
FIG. 3 shows a colored or patterned plant fiber fabric manufactured by a method of the present disclosure (FIG. 3 is actually a colored plant fiber fabric).

(1) A commercial plain, twill or satin ramie or flax fiber fabric (cloth) having a natural color or a brilliant color or pattern by printing or dyeing, or any one of the fabrics prepared from plant fibers with low damage in examples 1 to 6 was selected for dyeing or decoration to form a colored or patterned plant fiber reinforced fabric which was illustrated by photos in FIG. 3. The curing agent of commercial epoxy resin E44 and dehydrated T31 was selected and the ratio was 100:(from 20 to 25). Transparent and colorless epoxy resin was formed by vacuum mixing. Then after impregnating the ramie or flax fiber reinforced fabric and drying, a ramie or flax fiber reinforced fabric prepreg was obtained which had a natural color or a brilliant color or pattern by printing or dyeing.

(2) The above prepreg was laid on both the upper surface and the lower surface of a cheap plant fiber fabric prepreg preform. There was no limitation on the type of the cheap plant fiber fabric, and it was generally selected from any one of the plant fiber reinforced fabrics prepared with low damage and without decorative dyeing in examples 1-6. The principle of stacking placement is quasi isotropic. Similarly, it can also be laid on the upper surface and the lower surface of a prepreg preform of a glass fabric, an aramid fiber, an ultrahigh molecular weight polyethylene fabric, a carbon fiber fabric or a basalt fiber fabric. After curing at 60° C. for half an hour or micro pressure curing at room temperature for 24 hours, a structural-decorative-integrated composite laminated plate and its products were obtained, which had a natural color or a brilliant color or pattern by printing or dyeing and were illustrated by photos in FIG. 4.

(3) The ramie or flax fiber prepreg in (1) was laid on the upper surface and the lower surface of a rigid foamed structural sheet preform. There were two underlying layers of cheap plant fiber fabrics, such as jute and sisal fabrics. The principle of stacking placement was quasi isotropic. There were no limitation on the type and thickness of the foamed structural plate, and it may be selected from for example a rigid polyurethane foam or a PVC rigid foam, as long as it was compatible with the curing conditions described above (1) for the transparent and colorless epoxy resin. After curing at 60° C. for half an hour or micro pressure curing at room temperature for 24 hours, a structural-decorative-integrated foam sandwich composite material was obtained, which had a natural color or a brilliant color or pattern by printing or dyeing.

(4) The ramie or flax fiber prepreg in (1) was laid on the upper surface and the lower surface of a honeycomb slice preform. There were two underlying layers of cheap plant fiber fabrics, such as jute and sisal fabrics. The principle of stacking placement was quasi isotropic. There were no limitation on the material and specification of the honeycomb slice, and it may be selected from for example an aramid paper honeycomb, as long as it was compatible with the curing conditions described above (1) for the transparent and colorless epoxy resin. After curing at 60° C. for half an hour or micro pressure curing at room temperature for 24 hours, a structural-decorative-integrated honeycomb sandwich composite sheet was obtained, which had a natural color or a brilliant color or pattern by printing or dyeing.

Figure 4:
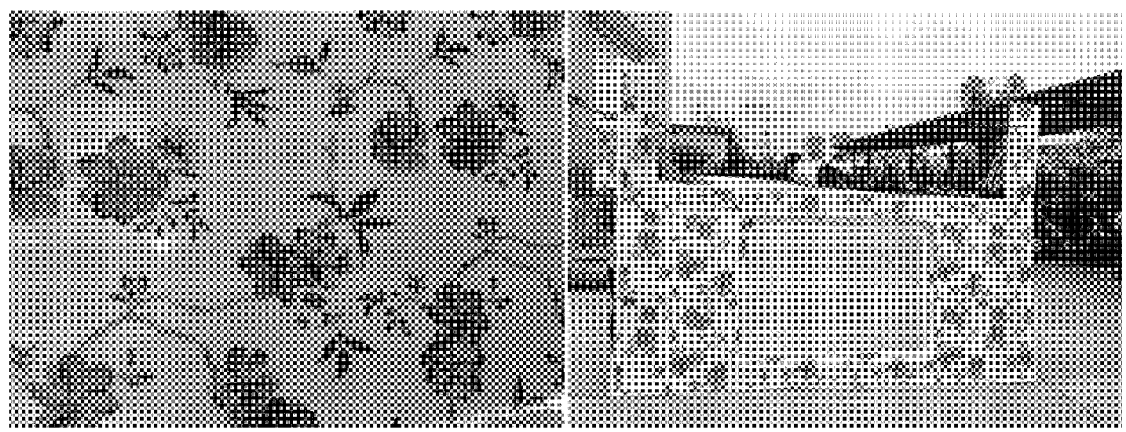
FIG. 4 shows a structure-decoration integrated composite laminated plate that is manufactured by a fiber reinforced fabric prepreg with a printed or dyed pattern and a product thereof (FIG. 4 is a laminated plate with a colored pattern and a product thereof).
Figure 4:
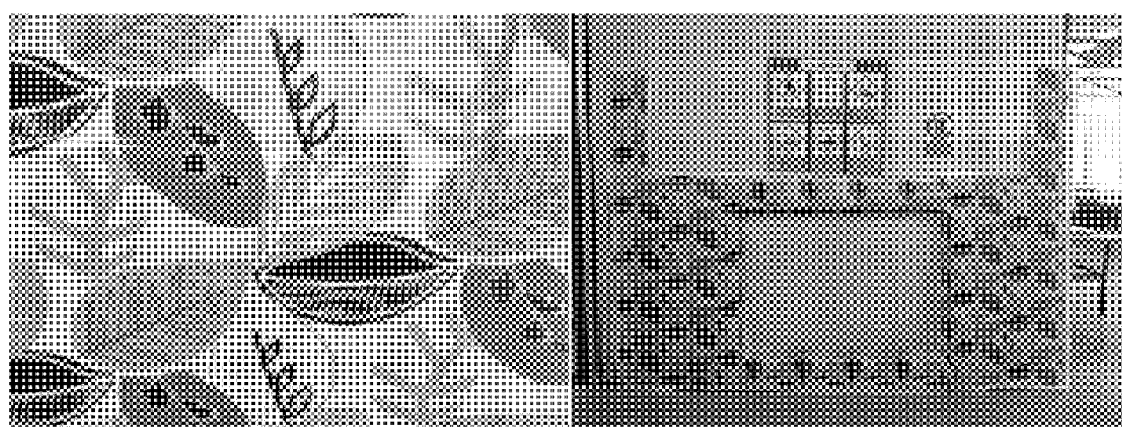

(5) The composite laminated plate or the sandwich composite material above can be used for interior ornaments of automobiles, rail buses and ships that require surface decoration (as shown in FIG. 4, interior wall panels of subway with a large window opening which were ramie fabric reinforced and structural-decorative-integrated), furnishings or building materials, structural packaging materials, fashion sports products, instrument and speaker shells, etc.

In the present example, the composite materials made of the plant fiber fabric having a printing and dyeing pattern, a natural or printed/dyed color, or a pure white color not only achieved the similar mechanical property in examples 1-6, but also had a decorative function. Due to no surface affixing, the working procedure was simplified and the manufacturing cost was saved.

Example 8 (Interfacial Compatibilization and Flame Retardant Treatment)

The silane coupling agent KH1550 was selected, and 2% aqueous solution of the coupling agent was prepared. The ramie or flax fiber fabric in example 7 was impregnated by the coupling agent aqueous solution, and a ramie or flax reinforced fabric pretreated with interfacial compatibilization was obtained after drying (the reinforced fabric was generally chosen from any colored or patterned plant fiber reinforced fabric with low fabric damage in examples 1-6). Then a commercial liquid flame retardant (for example, a fabric flame retardant produced by Changzhou Niulei Retardant Factory) was used to prepare 20% flame retardant aqueous solution. The ramie or flax fiber fabric in example 7 was impregnated by the 20% flame retardant aqueous solution to obtain an interfacially compatibilized flame-retardant ramie or flax fabric. Note that merely one of the two treatments can also be applied alone to obtain a single pretreated ramie or flax fabric.

The composite laminated plate was prepared according to example 7, and then the combustion performance was tested. It was found that in a case that the mass concentration of the flame retardant was about 10%, the total heat release of the flame retardant composite material reached about 50 kw min/m$^2$, and the peak heat release reached about 90 kw/m$^2$. In a case that the mass fraction of the flame retardant was about 20%, the total heat release of the flame retardant treatment composite material reached about 22 kW min/m$^2$, and the peak heat release reached about 60 kw/m$^2$. All of them met the fire retardant requirements for civil aircraft interior parts (such as OSU standard of the Boeing company).

Under the above conditions, the ignition time of the flame retardant composite material was 60 seconds, the flame temperature was 840° C., and the combustion time was about 2 minutes. The combustion length was about 160 mm, and there was no flame dripping.

Under the above conditions, the tensile strength of the flame retardant composite material was about 60 MPa, the in-plane shear strength was about 15 MPa, the compressive strength was about 50 MPa, the flexural strength and the flexural modulus were about 100 MPa and 8.5 GPa, respectively.

The test results showed that the composite material not only had a high flame-retarding property but also had a high mechanical property, in addition to its natural color or its brilliant color or pattern by printing or dyeing. It was well suitable for applications for which integration of structure, flame retardant function, and decoration was desired (for example, interior ornaments of automobiles, rail buses and ships, furnishings or building materials, structural packaging materials, fashion sports products, etc, as illustrated in example 7).

Figure 5:
FIG. 5 shows an aircraft interior (a composite material product) manufactured from a white ramie fiber fabric.

Another typical example was a beautiful pure white interior structure of the Chinese "Dragon 600" waterplane, which was prepared by interfacial compatibilization and flame retardant double treatment of a white ramie fabric. As shown in FIG. 5, the structure and decoration of the interior ornament were integrated.

Example 9 (Interfacial Compatibilization and Flame Retardant Treatment)

Another example of interfacial compatibilization and flame retardant treatment was to choose the silane coupling agent KH570 (Beijing Huabozhan Scientific Instrument Co., Ltd.) as the surface compatibilizer. 2% coupling agent aqueous solution was prepared, and the plant fiber fabric (chosen from any colored or patterned plant fiber reinforced fabric with low fabric damage in examples 1-6) was impregnated by the coupling agent aqueous solution. The nitrogen and phosphorus flame retardant with a brand of ZR-PZM was selected, and the concentration of its aqueous solution was 14%. The fabric pretreated by interfacial compatibilization was impregnated by the flame retardant aqueous solution. The flame retardant unsaturated polyester Synolite 9001 was selected, and the plant fiber fabric reinforced composite laminated plate was prepared by a liquid molding process (both the upper prepreg layer and the lower prepreg layer comprise the above-mentioned plant fiber fabric prepreg, and the base prepreg layer is made of jute). Jute has the lowest price and moderate performance material among the current raw fibers. Using jute in the composite material can reduce the cost of the composite material without loss in the performance of the composite material.

Tensile property and flexural property of the composite material were tested according to the ASTM standard. Compared with the laminated plate without compatibilization and flame retardant treatments, it was found that the tensile strength and flexural strength of the modified composite laminated plate increased by about 110 to 130%. The flame-retarding of the composite material also met the requirements for interior parts of rail traffic vehicles. On this basis, a pure white interior panel for metro vehicles was prepared by a liquid molding.

Example 10 (Interfacial Compatibilization, Flame Retardant Phenolic Resin and Honeycomb Core)

A commercialized and continuous ramie fiber industrial fabric was used, and the silane coupling agent KH560 was selected as an interfacial compatibilizer to prepare a 2% acetone solution of the coupling agent. The ramie fiber fabric (chosen from any colored or patterned plant fiber reinforced fabric with low fabric damage in examples 1-6) was impregnated by the acetone solution. Aviation flame-retardant phenolic resin Cycom 6070 was selected (supplier of Cytec, USA). The above interfacially compatibilized plant fiber fabric was impregnated by aviation flame-retardant phenolic resin to obtain the ramie fiber reinforced 6070 phenolic prepreg. The aramid paper honeycomb (Du Pont, USA) was used as the core material (the base prepreg layer), and the ramie fiber reinforced 6070 phenolic prepreg was used as the surface material (the upper prepreg layer and the lower prepreg layer). The ramie fiber reinforced aramid honeycomb sandwich composite material was prepared by hot pressing tank molding.

Figure 6:
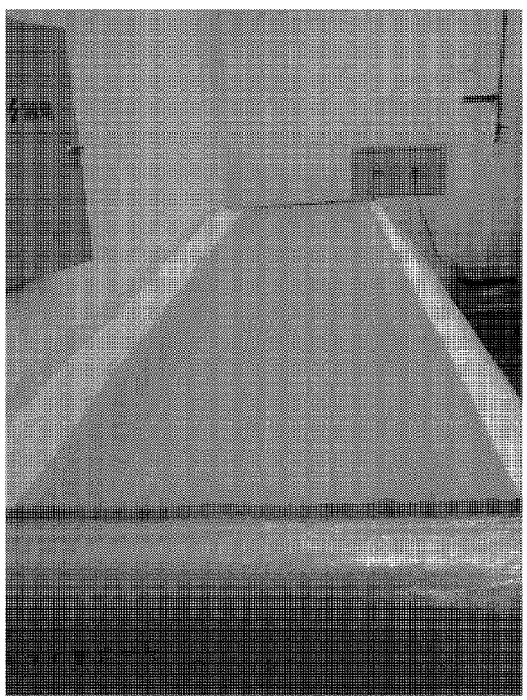
FIG. 6 shows a honeycomb sandwich structure (composite material) with a large curved surface manufactured from a ramie fiber fabric and a honeycomb sandwich.
Figure 6:
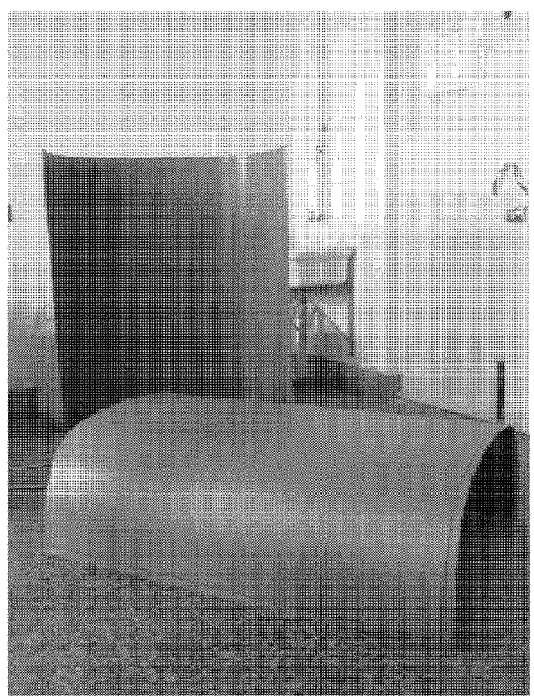

Tensile property and flexural property of ramie fiber reinforced 6070 phenolic prepreg composite material were tested according to ASTM standard. Compared with the composite material without modification treatments, it was found that the tensile strength and the flexural strength of the modified composite material laminated plate were increased from 105 MPa and 178 MPa to 123 MPa and 186 MPa, respectively. Moreover, the ramie fiber reinforced composite material and its honeycomb sandwich had an excellent paving property, and can be used to prepare a honeycomb sandwich structure with a large curved surface as illustrated in FIG. 6. Furthermore, the composite material also met the basic requirements on flame-retarding for civil aircraft interior parts (for example, boeing's OSU standard). Therefore, the composite material and its sandwich structure can be used for decorative interior structures of aircrafts and other vehicles such as subway, rail traffic, and ship, and can also be used for sports leisure goods, furniture and fashion parts.

Similarly, the honeycomb sandwich in the example was replaced by a foam core, such as a PMI foam, a polyurethane foam, or a rigid PVC foam. The obtained plant fiber reinforced composite material also had similar properties and can be used for similar applications.

The present disclosure includes the following embodiments.

Embodiment 1

A composite material, comprising: a base layer; a first plant fiber fabric on an upper surface of the base layer; optionally, a second plant fiber fabric on a lower surface of the base layer, and a resin present in each layer.

Embodiment 2

The composite material according to Embodiment 1, wherein the first plant fiber fabric and the second plant fiber fabric are each independently fabrics made of the following materials: ramie, flax, jute, china-hemp (hemp), kenaf or sisal.

Embodiment 3

The composite material according to Embodiment 1 or 2, wherein the first plant fiber fabric has at least one of the following characteristics: having a printed or dyed pattern, having a natural color or a printed or dyed color, or having a white color.

Embodiment 4

The composite material according to any one of Embodiments 1 to 3, wherein at least one of the first plant fiber fabric and the second plant fiber fabric is a plant fiber fabric treated by at least one of the following processes: an interfacial compatibilization treatment by using a coupling agent, an interfacial compatibilization treatment by using an aqueous solution of potassium permanganate, and a surface flame-retarding treatment by using a flame retardant.

Embodiment 5

The composite material according to any one of Embodiments 1 to 4, the resin is selected from a group consisting of light-colored to colorless transparent thermoplastic resins and light-colored to colorless transparent thermosetting resins.

Embodiment 6

The composite material according to any one of Embodiments 1 to 5, wherein the resin is selected from a group consisting of phenolic resin, epoxy resin, or unsaturated polyester.

Embodiment 7

The composite material according to any one of Embodiments 1 to 6, wherein the base layer is selected from a group consisting of carbon fiber, glass fiber, aramid fiber, ultrahigh molecular weight polyethylene fiber, basalt fiber fabric, plant fiber fabric, structural foam, honeycomb core materials.

Embodiment 8

The composite material according to any one of Embodiments 1 to 7, wherein the first plant fiber fabric and the second plant fiber fabric are formed independently by a method of manufacturing a plant fiber fabric, and the method comprises: biological degumming of raw fibers, or chemical degumming of raw fibers.

Embodiment 9

The composite material according to any one of Embodiments 1 to 7, wherein the first plant fiber fabric and the second plant fiber fabric are each formed independently by a method of manufacturing a plant fiber fabric, and the method comprises: biological degumming of raw fibers or chemical degumming of raw fibers, and drying to obtain a degummed fiber; pre-drawing, combing and gilling of the degummed fiber, and performing a roving process and a spinning process to obtain yarns; weaving the yarns into a gray fabric, rinsing the gray fabric with hot water and drying the gray fabric, and finally obtaining a half-bleached fabric, that is, the plant fiber fabric.

Embodiment 10

The composite material according to any one of Embodiments 1 to 9, wherein the first plant fiber fabric and the second plant fiber fabric each independently have a fiber yarn twist of 0 tpm (twist per meter) to about 90 tpm, for example, from 0 tpm to about 60 tpm, or from about 20 tpm to about 60 tpm.

Embodiment 11

The composite material according to any one of Embodiments 1 to 9, wherein at least one of the first plant fiber fabric and the second plant fiber fabric is a plant fiber fabric modified by carbon nanotube coating.

Embodiment 12

A product, comprising the composite material according to any one of Embodiments 1 to11.

Embodiment 13

The product according to Embodiment 12, wherein the product is selected from an interior panel of a vehicle (especially an aircraft such as an airplane), a building material, an indoor panel, a structural packaging material or a sporting goods.

Embodiment 14

A method for manufacturing a composite material, comprising: producing a plant fiber yarn from a plant raw material; weaving the plant fiber yarn to obtain a plant fiber fabric; and using the plant fiber fabric to form the composite material whose outermost layer is the plant fiber fabric.

Embodiment 15

The method according to Embodiment 14, wherein the plant raw material is raw fiber.

Embodiment 16

The method according to Embodiment 15, wherein the raw fiber is selected from ramie, flax, jute, china-hemp (hemp), kenaf or sisal.

Embodiment 17

The method according to Embodiment 15 or 16, wherein the producing the plant fiber yarn from the plant raw material comprises biological degumming of raw fibers or chemical degumming of raw fibers.

Embodiment 18

The method according to Embodiment 17, wherein the method excludes acid leaching, alkali boiling, stamping, acid washing and fiber refining of raw fibers.

Embodiment 19

The method according to any one of Embodiments 14 to 18, wherein the method further comprises adjusting the twist of the plant fiber yarns as from 0 tpm to about 90 tpm, or from 0 tpm to about 60 tpm, or from about 20 tpm to about 60 tpm.

Embodiment 20

The method according to any one of Embodiments 14 to 19, wherein the method further comprises modifying the plant fiber fabric by carbon nanotube coating.

Embodiment 21

The method according to Embodiment 20, wherein the modifying the plant fiber fabric by carbon nanotube coating is performed by using a mixture containing deionized water and carbon nanotubes with an amount of carbon nanotubes from 0.2 wt % to 5 wt % (or with an amount of carbon nanotubes from 0.5 wt % to 2 wt %), and the percentage is based on the total weight of the plant fiber fabric.

Embodiment 22

The method according to any one of Embodiments 14 to 20, wherein the method further comprises rinsing the plant fiber fabric for about 1 minute to about 1 hour, or for about 5 minutes to about 30 minutes, or for about 8 minutes to about 15 minutes by hot water at a temperature of about 80° C. to about 130° C. (or about 90° C. to about 120° C., or about 100° C. to about 115° C.).

Embodiment 23

The method according to Embodiment 22, wherein the method excludes singeing of the plant fiber fabric.

Embodiment 24

The method according to any one of Embodiments 14 to 23, wherein the method further comprises: printing or dyeing the plant fiber fabric with color or pattern.

Embodiment 25

The method according to any one of Embodiments 14 to 24, wherein the step of using the plant fiber fabric to form the composite material comprises:
impregnating the plant fiber fabric with a resin to form a plant fiber fabric prepreg;
placing the plant fiber fabric prepreg on an upper surface of a base prepreg and optionally on a lower surface of the base prepreg to form a composite material precursor, and curing the composite material precursor to form the composite material.

Embodiment 26

The method according to Embodiment 25, wherein the curing is carried out under a pressure from about 0.1 MPa to about 5 MPa.

Embodiment 27

The method according to Embodiment 25 or 26, wherein the curing is carried out at a temperature from about 20° C. to about 100° C.

Embodiment 28

The method according to Embodiment 25, wherein the curing is carried out for about 1 hour to 1 week.

Embodiment 29

The method according to any one of Embodiments 14 to 24, wherein the step of using the plant fiber fabric to form the composite material comprises:
placing the plant fiber fabric on an upper surface and optionally a lower surface of the base layer to form a laminate;
injecting a resin into the laminate; and
curing the injected resin to form the composite material.

Embodiment 30

The method according to Embodiment 29, wherein the curing is carried out under a pressure from about 0.1 MPa to about 5 MPa.

Embodiment 31

The method according to Embodiment 29 or 30, wherein the curing is carried out at a temperature from about 20° C. to about 100° C.

Embodiment 32

The method according to Embodiment 29, wherein the curing is carried out for about 1 hour to 1 week.

What are described above is related to only the illustrative embodiments of the disclosure and not limitative to the scope of the disclosure. The scope of the disclosure is defined by the accompanying claims.

What is claimed is:
1. A composite material, formed from plant fiber fabric, comprising:
a base layer;
a first plant fiber fabric on, and in direct contact with, an upper surface of the base layer;
a second plant fiber fabric on, and in direct contact with, a lower surface of the base layer; and
a resin present in each layer, wherein the resin exists in the base layer, the first plant fiber fabric and the second plant fiber fabric, and combines the base layer, the first plant fiber fabric, and the second plant fiber fabric of the composite material, and wherein the resin is selected from the group consisting of phenolic resin, epoxy resin, and unsaturated polyester;
wherein the first plant fiber fabric and the second plant fiber fabric are each formed independently by a method of manufacturing a plant fiber fabric,
wherein the method comprises chemical degumming by treating raw plant fibers with an auxiliary comprising sodium triphosphate ($Na_5P_3O_{10}$), a surfactant, and a non-acid leaching preparation, and wherein the surfactant is selected from sodium dodecylbenzene sulfonate, sodium polyacrylate, polyvinyl alcohol, alkyl polyoxyethylene ether, and sodium dibutyl naphthalene sulfonate;
wherein the method excludes acid leaching, alkali boiling, stamping, acid washing, and fiber refining of the raw plant fibers;
wherein the first plant fiber fabric and the second plant fiber fabric are each independently selected from fabrics made of the following materials: ramie, flax, jute, china-hemp (hemp), kenaf, or sisal;
the base layer consists of a material selected from a group consisting of carbon fiber, glass fiber, aramid fiber, ultrahigh molecular weight polyethylene fiber, basalt fiber fabric, structural foam, and honeycomb core materials; and
the composite material being formed by a method comprising:
(a) impregnating the plant fiber fabric with the resin to form a plant fiber fabric prepreg; placing the plant fiber fabric prepreg on an upper surface of a base prepreg and on a lower surface of the base prepreg to form a composite material precursor, and curing the composite material precursor to form the composite material; or
(b) placing the plant fiber fabric on an upper surface and a lower surface of the base layer to form a laminate; injecting the resin into the laminate; and curing the injected resin to form the composite material.

2. The composite material according to claim 1, wherein the first plant fiber fabric has at least one of the following characteristics: having a printed or dyed pattern, having a natural color or a printed or dyed color, or having a white color.

3. The composite material according to claim 1, wherein at least one of the first plant fiber fabric and the second plant fiber fabric is a plant fiber fabric treated by at least one of the following processes: an interfacial compatibilization treatment by using a coupling agent, an interfacial compatibilization treatment by using an aqueous solution of potassium permanganate, and a surface flame-retarding treatment by using a flame retardant.

4. The composite material according to claim 1, wherein the resin is selected from a group consisting of light-colored to colorless transparent thermoplastic resins and light-colored to colorless transparent thermosetting resins.

5. The composite material according to claim 1, wherein the method further comprises: drying to obtain a degummed fiber; pre-drawing, combing and gilling of the degummed fiber, and performing a roving process and a spinning process to obtain yarns; weaving the yarns into a gray fabric, rinsing the gray fabric with hot water and drying the gray fabric, and obtaining a half-bleached plant fiber fabric.

6. The composite material according to claim 1, wherein the first plant fiber fabric and the second plant fiber fabric each independently have a fiber yarn twist of 0 tpm (twist per meter) to about 90 tpm.

7. The composite material according to claim 1, wherein at least one of the first plant fiber fabric and the second plant fiber fabric is a plant fiber fabric modified by carbon nanotube coating.

8. A product, comprising the composite material according to claim 1.

9. The product according to claim 8, wherein the product is selected from an interior panel of a vehicle, a building material, an indoor panel, a structural packaging material or a sporting goods.

10. A method for manufacturing the composite material according to claim 1, comprising:
producing a plant fiber yarn from a plant raw material by chemical degumming,
wherein chemical degumming comprises treating fibers of the plant raw material with an auxiliary comprising sodium triphosphate ($Na_5P_3O_{10}$), a surfactant, and a non-acid leaching preparation, and the surfactant is selected from sodium dodecylbenzene sulfonate, sodium polyacrylate, polyvinyl alcohol, alkyl polyoxyethylene ether, and sodium dibutyl naphthalene sulfonate, and
wherein producing the plant fiber yarn from the plant raw material excludes acid leaching, alkali boiling, stamping, acid washing, and fiber refining of raw fibers;
weaving the plant fiber yarn to obtain a plant fiber fabric; and
using the plant fiber fabric to form the composite material having an outermost layer comprising the plant fiber fabric;
wherein the first plant fiber fabric and the second plant fiber fabric are each independently selected from fabrics made of the following materials: ramie, flax, jute, china-hemp (hemp), kenaf or sisal;
the base layer consists of a material selected from the group consisting of carbon fiber, glass fiber, aramid fiber, ultrahigh molecular weight polyethylene fiber, basalt fiber fabric, structural foam, and honeycomb core materials; and
the step of using the plant fiber fabric to form the composite material comprises:
(a) impregnating the plant fiber fabric with the resin to form a plant fiber fabric prepreg; placing the plant fiber fabric prepreg on an upper surface of a base prepreg and on a lower surface of the base prepreg to form a composite material precursor, and curing the composite material precursor to form the composite material; or
(b) placing the plant fiber fabric on an upper surface and a lower surface of the base layer to form a laminate; injecting the resin into the laminate;
and curing the injected resin to form the composite material.

11. The product according to claim 9, wherein the vehicle is an aircraft.

12. The method according to claim 10, wherein the method further comprises adjusting the twist of the plant fiber yarns from 0 tpm to about 90 tpm, from 0 tpm to about 60 tpm, or from about 20 tpm to about 60 tpm.

13. The method according to claim 10, further comprising modifying the plant fiber fabric with a carbon nanotube coating.

14. The method according to claim 13, wherein the modifying the plant fiber fabric with the carbon nanotube coating is performed by using a mixture containing deionized water and carbon nanotubes with an amount of carbon nanotubes from 0.2 wt % to 5 wt %, and the percentage is based on the total weight of the plant fiber fabric.

15. The method according to claim 10, further comprising rinsing the plant fiber fabric for about 1 minute to about 1 hour, for about 5 minutes to about 30 minutes, or for about 8 minutes to about 15 minutes with hot water at a temperature of about 80° C. to about 130° C.

16. The method according to claim 15, wherein the method excludes singeing of the plant fiber fabric.

* * * * *